Fig. 1.
104958
PATENTED JUL 5 1870
Albert G. Hotchkiss.
Impt. in boring tools.
Albert G. Hotchkiss
per L. W. Serrell
atty.
Witnesses,
Chas. H. Smith
Geo. D. Walker
Fig. 2.
Fig. 3.
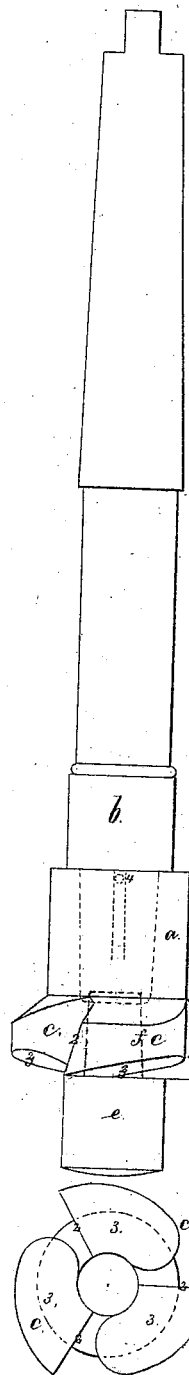
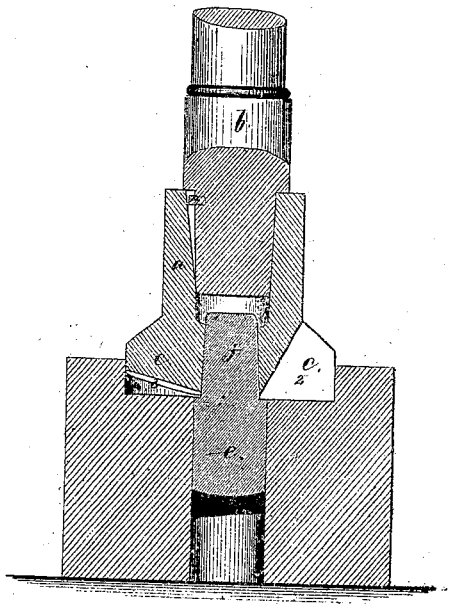
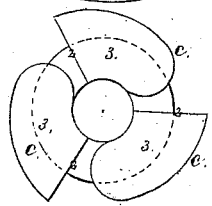

United States Patent Office.

ALBERT G. HOTCHKISS, OF WOLCOTTVILLE, CONNECTICUT.

Letters Patent No. 104,958, dated July 5, 1870.

IMPROVED BORING-TOOL.

The Schedule referred to in these Letters Patent and making part of the same.

To all whom it may concern:

Be it known that I, ALBERT G. HOTCHKISS, of Wolcottville, in the county of Litchfield and State of Connecticut, have invented and made a new and useful Improvement in Tools for Boring; and the following is hereby declared to be a correct description of the same.

Heretofore boring-tools have been made with a center-pin or bit to pass into a hole that has been bored, and act as a guide to the cutter portion of the tool in boring a larger hole or countersink on line with and as a portion of the first hole.

Boring-tools of this kind are usually made of one piece, and hence each tool has to be made with special reference to the relative sizes of the first and second portions of the hole to be formed.

My invention is made with reference to the use of one cutting-tool for enlarging the hole to a given size from any size of hole that may have previously been bored; and this I effect by providing removable center-pins or bits of varying diameters, but having a uniform-sized shank to set into a hole in the boring-cutter, so that, within certain specified ranges in the relative sizes of the cutters and center-pins, they may be used interchangeably, and thus a hole may be enlarged by using the corresponding-sized center-pin in a cutter of any size required for the desired enlargement.

This interchangeable feature of the center-pin and boring-tool is limited to the proper proportions for obtaining the necessary strength of center-pin compared with the size of cutter to be guided thereby.

My cutter is constructed so as to be much more easily sharpened and kept in order than the cutters or boring-tools heretofore made with a central guiding-pin, because, in sharpening the tool, the guiding-pin is removed, and the face of the cutter is unobstructed, so that the edge can be sharpened from end to end, one end of the cutting-edge being at the hole for the center-plug, and the other end at the periphery of the cutter.

In the drawing—

Figure 1 is an elevation of the cutter complete;

Figure 2 is a section of the tool as in use for boring an enlargement of the previously-bored hole; and Figure 3 is an end view of the cutter without the center-pin or bit.

The cutting-tool is made with a socket, *a*, for receiving the tapering end of the stem or stock *b*; and from the lower part of the socket *a* the cutting-edges *c c* project.

These cutting-edges are made at the proper angle, the faces 2 being at a backward inclination, and the lower faces 3 being inclined upward and backward from the cutting-edges, so that the tool can be sharpened by grinding the faces 3; and this can be done freely when the center-pin is removed from the tool.

The stock *b* is provided with a key, 4, entering a slot in the socket *a*, so that the parts will turn together.

The center-pins are made with body-portions, *e*, and shanks, *f*.

The shanks *f* in the various center-pins are all of the same size, but the body-portions *e* are of different sizes in the different center-pins.

I provide in each set of boring-tools a given number of cutters of sizes varying from one given measurement for the smallest cutter up to another measurement as the largest cutter.

I also provide the requisite number of center-pins, of sizes adapted to the set of cutters; and, as any center-pins can be used with any cutter in the set, any desired enlargement within the capacity of the set can be made by selecting the proper center-pin and cutter, and placing them together.

I claim as my invention—

The improved tool herein described, consisting of the cutter-head *a c*, stock *b*, and smooth cylindrical center-pin *e f*, substantially as and for the purposes set forth.

Signed this 28th day of January, A. D. 1870.

ALBERT G. HOTCHKISS.

Witnesses:
JUS. S. BARBOUR,
HENRY S. BARBOUR.